(12) United States Patent
Strack

(10) Patent No.: US 9,151,447 B2
(45) Date of Patent: Oct. 6, 2015

(54) LINER FOR A PRESSURE VESSEL AND METHOD

(75) Inventor: Ludger Strack, Heidenrod (DE)

(73) Assignee: GM Global Technology Operations LLC, Detroit, MI (US)

( * ) Notice: Subject to any disclaimer, the term of this patent is extended or adjusted under 35 U.S.C. 154(b) by 1241 days.

(21) Appl. No.: 12/720,767

(22) Filed: Mar. 10, 2010

(65) Prior Publication Data

US 2011/0220659 A1    Sep. 15, 2011

(51) Int. Cl.
*F17C 1/16* (2006.01)

(52) U.S. Cl.
CPC ........... *F17C 1/16* (2013.01); *F17C 2201/0109* (2013.01); *F17C 2203/0604* (2013.01); *F17C 2203/066* (2013.01); *F17C 2203/0621* (2013.01); *F17C 2203/0656* (2013.01); *F17C 2205/0305* (2013.01); *F17C 2205/0323* (2013.01); *F17C 2205/0397* (2013.01); *F17C 2209/2118* (2013.01); *F17C 2209/2127* (2013.01); *F17C 2209/2145* (2013.01); *F17C 2209/221* (2013.01); *F17C 2209/227* (2013.01); *F17C 2209/234* (2013.01); *F17C 2221/012* (2013.01); *F17C 2223/0153* (2013.01); *F17C 2223/033* (2013.01); *F17C 2260/01* (2013.01); *Y02E 60/321* (2013.01); *Y10T 29/49947* (2015.01); *Y10T 29/49968* (2015.01)

(58) Field of Classification Search
CPC ...... F17C 1/16; F17C 1/00; F17C 2203/0604; F17C 2205/0305

USPC ......... 220/586, 581, 582, 592, 588, 601, 661; 206/0.6

See application file for complete search history.

(56) References Cited

U.S. PATENT DOCUMENTS

| | | | | |
|---|---|---|---|---|
| 3,348,728 | A * | 10/1967 | Love | 220/581 |
| 3,353,849 | A * | 11/1967 | Laurizio | 285/21.2 |
| 3,891,118 | A * | 6/1975 | Laurizio | 220/288 |
| 3,907,149 | A * | 9/1975 | Harmon | 220/590 |
| 4,589,563 | A * | 5/1986 | Born | 220/581 |
| 5,429,845 | A * | 7/1995 | Newhouse et al. | 428/34.1 |
| 5,746,344 | A * | 5/1998 | Syler et al. | 220/62.22 |
| 5,839,600 | A * | 11/1998 | Moreira et al. | 220/560.04 |
| 5,938,209 | A * | 8/1999 | Sirosh et al. | 277/622 |
| 5,979,692 | A * | 11/1999 | West | 220/586 |
| 6,186,356 | B1 * | 2/2001 | Berkley et al. | 220/582 |
| 6,227,402 | B1 * | 5/2001 | Shimojima et al. | 220/581 |
| 6,230,922 | B1 * | 5/2001 | Rasche et al. | 220/586 |
| 6,793,095 | B1 * | 9/2004 | Dulisse et al. | 220/612 |
| 7,032,767 | B2 * | 4/2006 | Funck | 220/581 |
| 7,549,555 | B2 * | 6/2009 | Suzuki et al. | 220/581 |
| 7,648,042 | B2 * | 1/2010 | Lee et al. | 220/601 |

(Continued)

FOREIGN PATENT DOCUMENTS

| | | |
|---|---|---|
| CN | 101548128 A | 9/2009 |
| DE | 19526154 | 1/1997 |

(Continued)

*Primary Examiner* — Steven A. Reynolds
(74) *Attorney, Agent, or Firm* — Fraser Clemens Martin & Miller LLC; James D. Miller

(57) ABSTRACT

A pressure vessel for storing a fluid is disclosed. The pressure vessel including a vessel liner having a substantially smooth outer surface including a flange portion with an aperture formed therein and an end cap coupled to the vessel liner to substantially enclose the flange portion within the resultant pressure vessel.

15 Claims, 6 Drawing Sheets

(56) References Cited

U.S. PATENT DOCUMENTS

| | | | |
|---|---|---|---|
| 7,857,159 B2* | 12/2010 | Lindner | 220/586 |
| 7,861,887 B2* | 1/2011 | Ota et al. | 220/581 |
| 2004/0173618 A1* | 9/2004 | Suzuki et al. | 220/581 |
| 2004/0182869 A1* | 9/2004 | Kubo et al. | 220/581 |
| 2004/0206762 A1* | 10/2004 | Iida et al. | 220/581 |
| 2008/0251520 A1* | 10/2008 | Ota et al. | 220/586 |
| 2010/0025411 A1* | 2/2010 | Otsubo et al. | 220/581 |
| 2011/0101001 A1* | 5/2011 | Veenstra | 220/581 |
| 2011/0220661 A1* | 9/2011 | Strack | 220/586 |

FOREIGN PATENT DOCUMENTS

| | | |
|---|---|---|
| EP | 1850058 | 10/2007 |
| WO | 99/13263 | 3/1999 |
| WO | WO 99/39896 | 8/1999 |
| WO | WO 2007/079971 | 7/2007 |
| WO | WO 2007110399 | 10/2007 |

* cited by examiner

LINER FOR A PRESSURE VESSEL AND METHOD

FIELD OF THE INVENTION

The invention relates to pressure vessels. More particularly, the invention is directed to a vessel liner and a method for manufacturing the vessel liner.

BACKGROUND OF THE INVENTION

A pressure vessel for storing a fluid medium (such as hydrogen) typically includes a pressure chamber which contains the pressurized fluid medium that is moved in a controlled manner in or out of the vessel. In certain designs, the pressure vessel includes an inner plastic liner with two metal mouthpieces (bosses) arranged on opposite ends, and a filament wound outer shell to support the inner vessel liner.

Typically, the vessel liner is manufactured using a conventional injection molding, blow molding, rotational molding process, or thermoforming process. For example, the following patent documents describe a vessel liner (WO 1999/039896 Dulisse, JMK; WO 2007/079971 Wilier, Xperion; DE 19526154 Lange, Mannesmann etc.; and WO 1999/013263 Jensen, Raufoss), each of which is incorporated herein by reference in its entirety.

To permit controlled movement of fluids in or out of the pressure chamber, the vessel is typically configured with a pressure chamber orifice and a boss is fitted in the orifice. The boss is threaded or otherwise shaped for connection to nozzles, valves, gauges, tubes, and similar fixtures which direct and control fluid flow. Accordingly, the boss is formed of a metal or another conventional material having desired properties.

The boss typically includes a cylindrical neck with a longitudinal passage that provides fluid communication between the pressure chamber and the environment outside the vessel. In certain designs, the boss includes a shoulder portion secured to one end of the neck. The shoulder portion, which is larger than the pressure chamber orifice, is secured to the liner of the pressure vessel to militate against relative movement between the boss and the liner.

In application, a composite structure of the pressure vessel has to bear all forces. It is important to provide a smooth outer surface on the liner of the pressure vessel to guarantee the performance of the composite structure.

It would be desirable to develop a vessel liner and a method for manufacturing the vessel liner, wherein the vessel liner is formed having a substantially smooth outer surface.

SUMMARY OF THE INVENTION

Concordant and consistent with the present invention, a vessel liner and a method for manufacturing the vessel liner, wherein the vessel liner is formed having a substantially smooth outer surface, has surprisingly been discovered.

In one embodiment a vessel liner having a substantially smooth outer surface including a flange portion with an aperture formed therein; and an end cap coupled to the vessel liner to substantially enclose the flange portion within the resultant pressure vessel.

In another embodiment a vessel liner having a substantially smooth outer surface including a flange portion with an aperture formed therein; an end cap coupled to the vessel liner to substantially enclose the flange portion within the resultant pressure vessel; and a boss coupled to the end cap, wherein the boss receives and secures a utility device to the end cap to direct and control fluid flow in and out of the pressure vessel.

The invention also provides methods for manufacturing a pressure vessel.

One method comprises the steps of: forming a vessel liner having a substantially smooth outer surface, wherein the vessel liner includes a flange portion with an aperture formed therein; forming an end cap; and coupling the end cap to the vessel liner to substantially enclose the flange portion within the resultant pressure vessel.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

Figure 1:
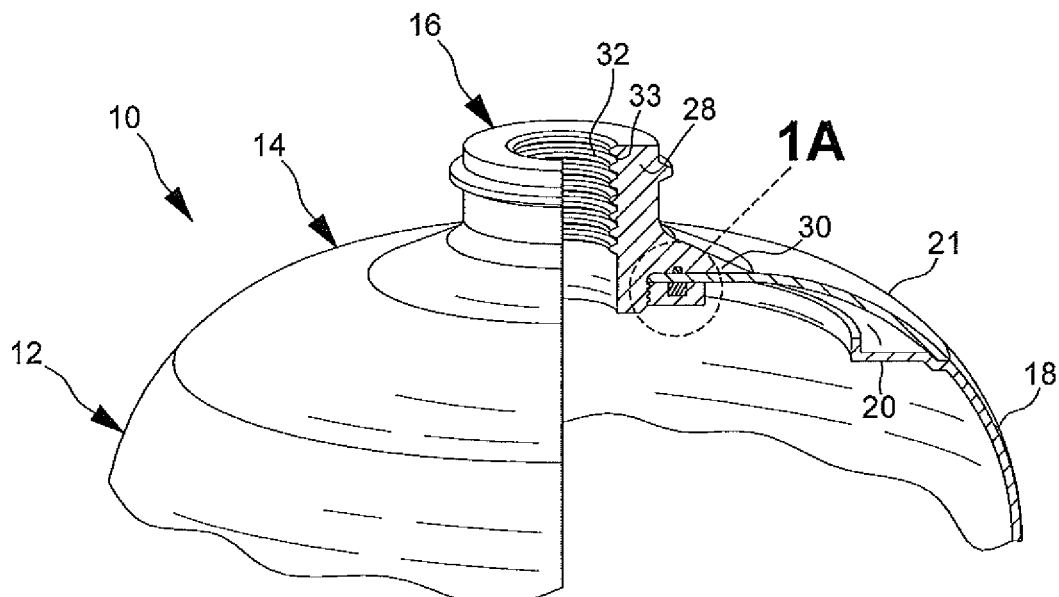
FIG. 1 is a fragmentary perspective view of a pressure vessel according to an embodiment of the present invention, a portion of the pressure vessel shown in section.
Figure 1A:
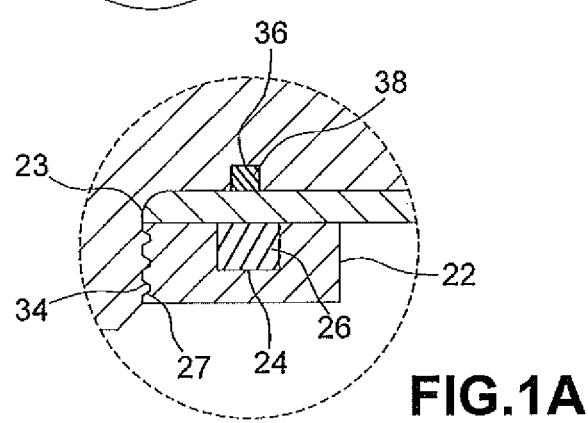
FIG. 1a is an enlarged fragmentary cross-sectional front elevational view of a portion of the pressure vessel illustrated in FIG. 1 and depicted by circle 1a therein.
Figure 2:
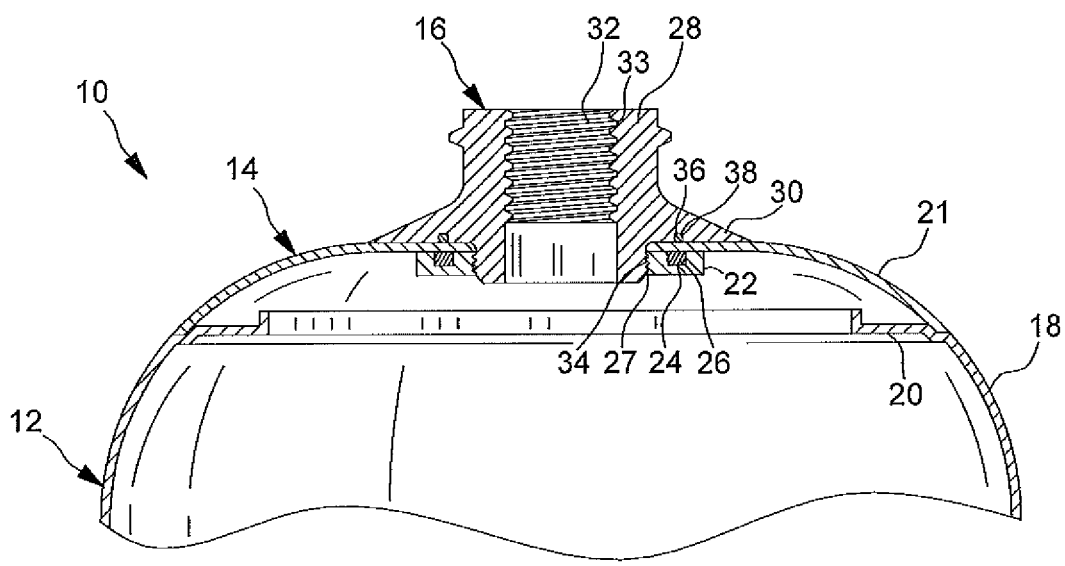
FIG. 2 is a fragmentary cross-sectional view of the pressure vessel of FIG. 1.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1, 1a, and 2 illustrate a pressure vessel 10 according to an embodiment of the present invention. As shown, the pressure vessel 10 includes a vessel liner 12, an end cap 14, and a boss 16.

The vessel liner 12 is typically formed by a blow molding process as is known in the art. However, other molding and forming methods may be used to produce the vessel liner 12 such as injection and rotational molding, for example. As a non-limiting example, the vessel liner 12 is formed from a thermoplastic material. However, other plastics and non-metallic materials may be used. As shown, the vessel liner 12 includes a substantially smooth outer surface 18 defining a substantially cylindrical shape and a flange portion 20 defining an aperture in at least one end of the vessel liner 12. It is understood that the vessel liner 12 may have any shape and size, and may have any number of apertures formed therethrough.

The end cap 14 is formed from a molding or forming process known in the art. As a non-limiting example, the end cap 14 may be formed using a thermoforming process or an injection molding process. The end cap 14 is coupled to the vessel liner 12 to substantially enclose the flange 20 of the vessel liner 12 within the resultant pressure vessel 10. It is understood that various means for coupling the end cap 14 to the vessel liner 12 may be used such as a welding procedure and a plurality of engaging devices, for example. As such, a first surface 21 of the end cap 14 forms a substantially continuous surface with the outer surface 18 of the vessel liner 12.

As shown, the end cap 14 includes an insert 22 disposed around an aperture 23 formed in the first surface 21 thereof. The insert 22 is typically formed from a metal. However, other materials such as plastic, rubber, and resin may be used. The insert 22 includes a first annular channel 24 formed therein, wherein the first annular channel 24 is adapted to receive a first sealing element 26. As shown, the insert 22 includes a single channel. However, any number of channels and sealing elements may be used. As a non-limiting example, the first sealing element 26 is an O-ring formed from at least one of an elastomer and a plastic. However, other materials having desired characteristics may be used such as a rubber, a metal, and an ultra high molecular weight polyethylene (UHMW-PE), for example. As a further example, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example. The insert 22 also includes a first coupling element 27 for engaging and securing the insert 22 to the boss 16. As a non-limiting example, the first coupling element 27 includes a substantially helical thread or groove formed on a surface of the insert 22. However, other means for engaging and securing the insert 22 and the boss 16 may be used.

The boss 16 is typically formed from a metal. However, other materials such as plastic, rubber, and resin may be used. As shown, the boss 16 includes a neck portion 28 and a shoulder portion 30. The neck portion 28 includes a second coupling element 32 and a third coupling element 34. The second coupling element 32 engages and secures various fixtures and utility devices such as pressure regulators, nozzles, valves, gauges, tubes, and similar fixtures which direct and control fluid flow in and out of the pressure vessel 10. As a non-limiting example, the second coupling element 32 includes a substantially helical thread or groove formed on an inside surface 33 of the neck portion 28. However, other means for engaging and securing the utility devices and the boss may be used. The third coupling element 34 typically includes a substantially helical thread or groove formed on an outside surface 35 of the neck portion 28 for engaging the first coupling element of the insert 22. However, other means may be used.

The shoulder portion 30 of the boss 16 includes a second annular channel 36 formed therein, wherein the second annular channel 36 is adapted to receive a second sealing element 38. As shown, the shoulder portion 30 includes a single channel including a single sealing element. However, any number of channels and sealing elements may be used. As a non-limiting example, the second sealing element 38 is an O-ring formed from at least one of an elastomer and a plastic. However, other materials having desired characteristics may be used such as a rubber, a metal, and an ultra high molecular weight polyethylene (UHMW-PE), for example. As a further example, an encapsulated O-ring may be used, wherein the encapsulated O-ring includes multiple layers formed from various materials such as fluorinated ethylene propylene, fluoroelastomers (FKM), and methyl-vinyl silicone rubber (VMQ), for example.

In use, a parison (not shown) of the vessel liner 12 is guided around a blow pin, as known in the art of blow molding. As such, a blow tool, known in the art, closes around the parison and "pinches" or secures the parison around a circumference of the flange portion 20 of the vessel liner 12. Thereafter, the blow pin introduces air into the parison, thereby expanding the parison into the hollow vessel liner 12. It is understood that other gases or fluids may be used to form the hollow vessel liner 12. After the vessel liner 12 has a desired form, the blow tool releases the formed vessel liner 12 and any scrap material of the parison is removed by a cutting process known to one skilled in the art of blow molding.

Once the vessel liner 12 is formed, at least one end cap 14 is coupled to at least one end of the vessel liner 12. It is understood that a diameter of the coupling area (e.g. welding seam) between the vessel liner 12 and the end cap 14 is dependent on the blow ratio of the liner material structure. As a non-limiting example, a shape of the vessel liner 12 and the end cap 14 is pre-determined to maximize the coupling surface area therebetween. It is understood that that the vessel liner 12 may be coupled to the end cap 14 using a welding procedure. However, other coupling means may be used, such as an adhesive, for example. As such, the outer surface 18 of the vessel liner 12 is substantially "pinch line free", since only the flange portion 20 has a pinch line from the forming process. Thereafter, the boss 16 is coupled to the end cap 14. As a non-limiting example, the boss 16 is screwed to the insert 22, thereby "squeezing" the insert 22 and the first sealing element 26 against the vessel liner 12 to form a fluid-tight seal. As a further example, the boss 16 may be a divided boss formed from at least two components (not shown) and the end cap 14 may be disposed between the at least two components to couple the end cap 14 with the boss 16.

Figure 3:
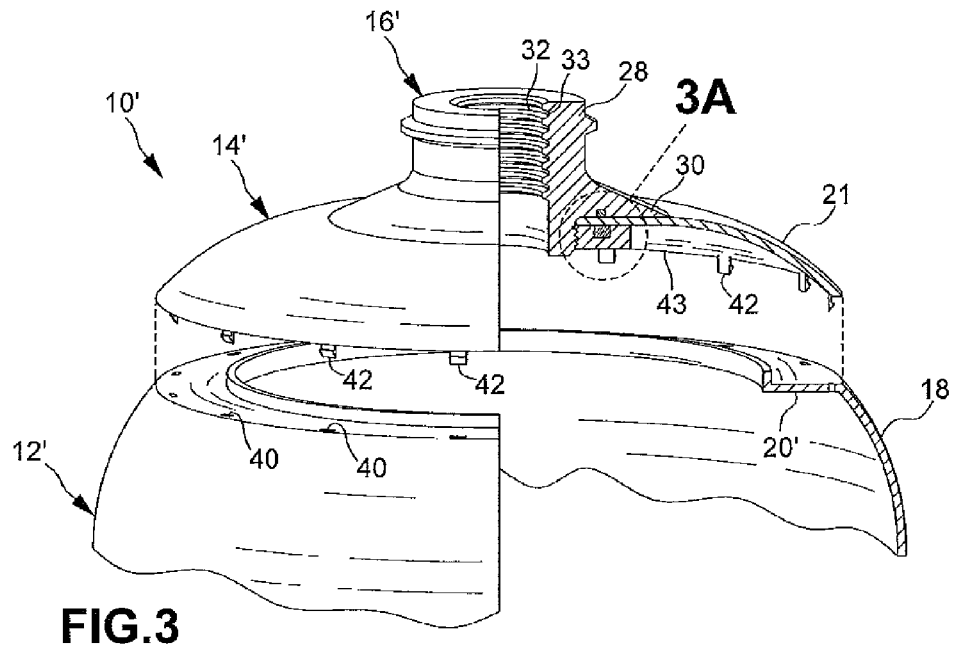
FIG. 3 is a fragmentary perspective view of a pressure vessel according to another embodiment of the present invention, a portion of the pressure vessel shown in section.
Figure 3A:
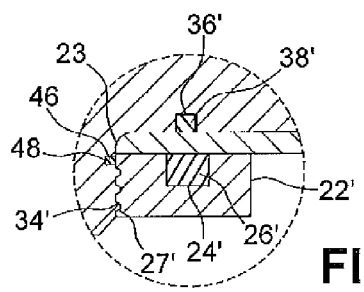
FIG. 3a is an enlarged fragmentary cross-sectional front elevational view of a portion of the pressure vessel illustrated in FIG. 3 and depicted by circle 3a therein.
Figure 4:
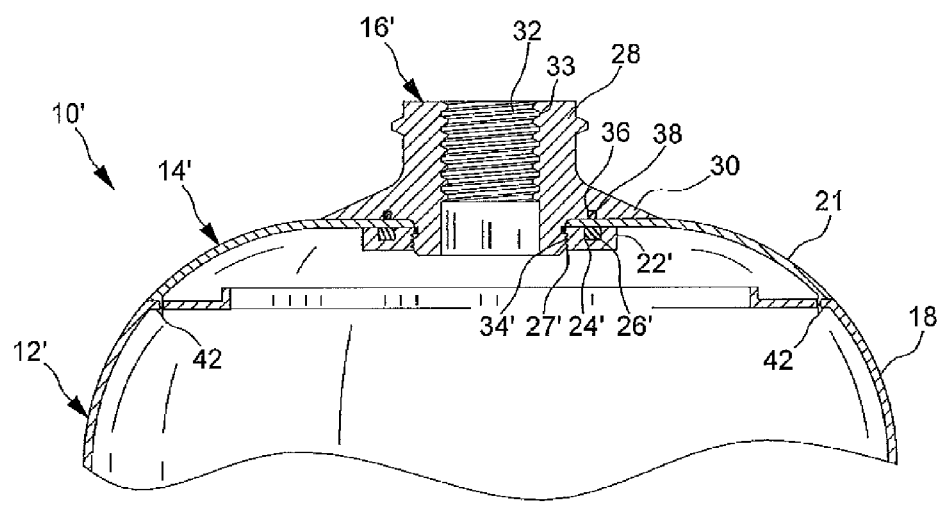
FIG. 4 is a fragmentary cross-sectional view of the pressure vessel of FIG. 3.

FIGS. 3, 3a, and 4 illustrate a pressure vessel 10' according to another embodiment of the present invention similar to the pressure vessel 10 of FIGS. 1 and 2, except as described below. Structure repeated from the description of FIGS. 1 and 2 includes the same reference numeral. Variations of structure shown in FIGS. 1 and 2 include the same reference numeral and a prime (') symbol.

As shown in FIGS. 3, 3a, and 4 the flange portion 20' of the vessel liner 12' includes a plurality of apertures 40 formed in a substantially circumferential pattern. Additionally, the end cap 14' includes a plurality of retention clips 42 formed along a sealing edge 43 of the end cap 14' and a third annular channel 44 adapted to receive a third sealing element 46 disposed adjacent the first coupling element 27' of the insert 22.

In use, the retention clips 42 of the end cap 14' are aligned with the apertures 40 formed in the flange 20' of the vessel liner 12'. As such, the apertures 40 receive the retention clips 42 to securely couple the end cap 14' to the vessel liner 12'. It is understood that the placement of the retention clips 42 and apertures 40 may be such that the first surface 21 of the end cap 14' forms a substantially continuous surface with the outer surface 18 of the vessel liner 12'.

Figure 5:
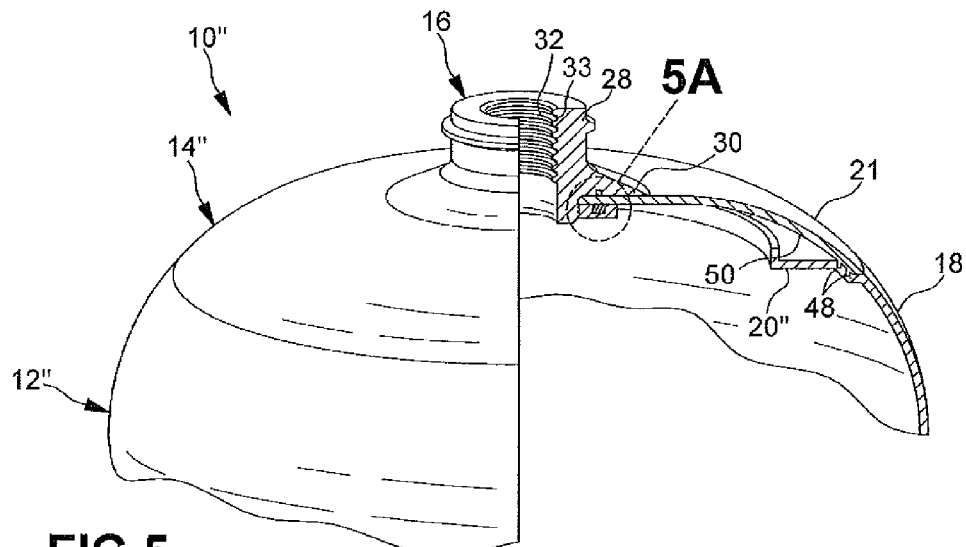
FIG. 5 is a fragmentary perspective view of a pressure vessel according to another embodiment of the present invention, a portion of the pressure vessel shown in section.
Figure 5A:
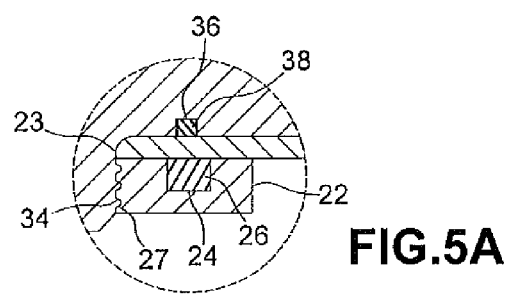
FIG. 5a is an enlarged fragmentary cross-sectional front elevational view of a portion of the pressure vessel illustrated in FIG. 5 and depicted by circle 5a therein.
Figure 6:
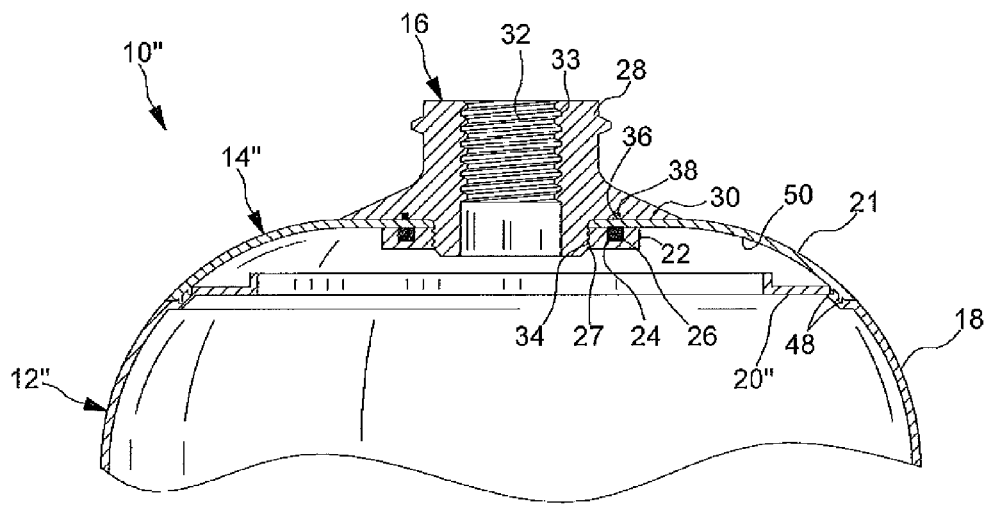
FIG. 6 is a fragmentary cross-sectional view of the pressure vessel of FIG. 5.

FIGS. 5, 5a, and 6 illustrate a pressure vessel 10" according to another embodiment of the present invention similar to the pressure vessel 10 of FIGS. 1 and 2, except as described below. Structure repeated from the description of FIGS. 1 and 2 includes the same reference numeral. Variations of structure shown in FIGS. 1 and 2 include the same reference numeral and a double-prime (") symbol.

As shown in FIGS. 5, 5a, and 6 the end cap 14" includes a plurality of engaging teeth 48 formed along an inside surface 50 of the end cap 14". It is understood that the engaging teeth 48 may be protrusions, ribs, hooks and the like, for securing the end cap 14" to a portion of the vessel liner 12". It is understood that the engaging teeth may have any size and shape.

In use, the engaging teeth 48 engage the flange portion 20" of the vessel liner 12" to securely couple the end cap 14" to the vessel liner 12". It is understood that the placement of the engaging teeth 48 may be such that the first surface 21 of the end cap 14" forms a substantially continuous surface with the outer surface 18 of the vessel liner 12". It is further understood that the end cap 14" may include channels or grooves (not shown) for receiving the engaging teeth 48.

Figure 7:
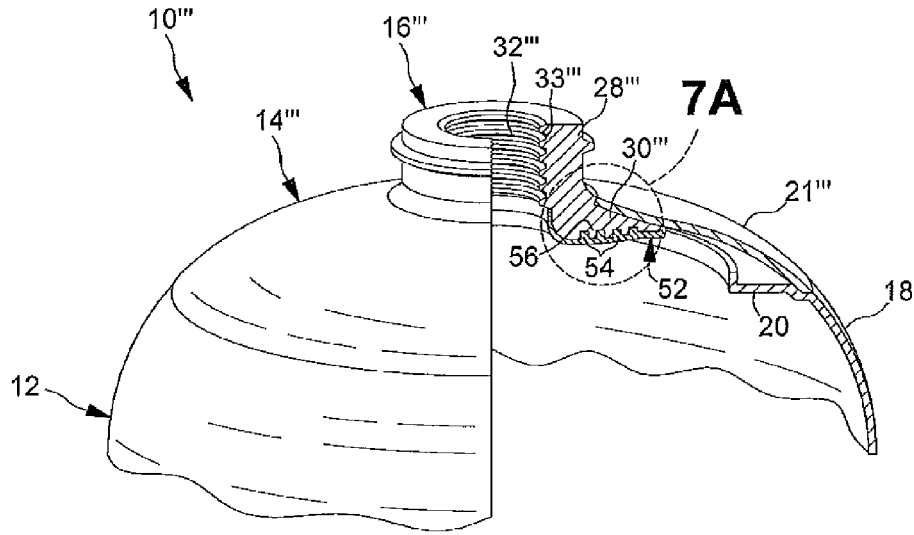
FIG. 7 is a fragmentary perspective view of a pressure vessel according to another embodiment of the present invention, a portion of the pressure vessel shown in section.
Figure 8:
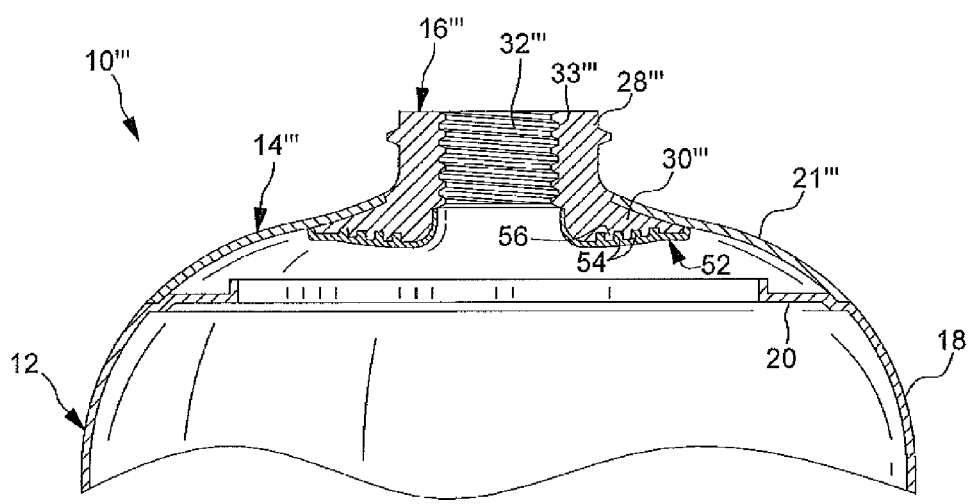
FIG. 8 is a fragmentary cross-sectional view of the pressure vessel of FIG. 7.

FIGS. 7 and 8 illustrate a pressure vessel 10" according to another embodiment of the present invention similar to the pressure vessel 10 of FIGS. 1 and 2, except as described below. Structure repeated from the description of FIGS. 1 and 2 includes the same reference numeral. Variations of structure shown in FIGS. 1 and 2 include the same reference numeral and a triple-prime ("') symbol.

Figure 7A:
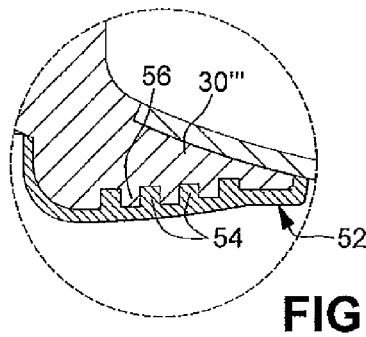
FIG. 7a is an enlarged fragmentary cross-sectional front elevational view of a portion of the pressure vessel illustrated in FIG. 7 and depicted by circle 7a therein.

As shown in FIGS. 7, 7a, and 8 the boss 16"' is integrated with the end cap 14"'. As shown, the end cap 14"' includes a flange portion 52 disposed adjacent the boss 16"'. As more clearly shown in FIG. 7a, the flange portion 52 of the end cap 14"' includes a plurality of protrusions 54 disposed in an alternating pattern with a plurality of protrusions 56 formed in the boss 16"'. As a non-limiting example, the flange portion 52 is formed from a glass fiber reinforced thermoplastic having at least twenty percent fiber content. However, other materials having a desirable linear thermal expansion coefficient and fiber content may be used. It is further understood that the boss 16"' may have any shape, size, and features to securely engage the end cap 14"'.

In use, the boss 16"' is integrated with the end cap 14"' during a forming process of the end cap 14"'. As a non-limiting example, during an injection molding process to form the end cap 14"', the molding material is directed around at least a portion of the boss 16"'. Additionally, the flange portion 52 of the end cap 14"' is formed adjacent the protrusions 56 of the boss 16"'. Once completely formed, the end cap 14"' is integrally fixed with the boss 16"'. The flange portion 52 of the end cap 14"' minimizes the issues associated with discrepancies between the coefficients of thermal expansion of the end cap 14"' and the boss 16"', while allowing a wider variety of materials to be used to form the end cap 14"'.

Figure 9:
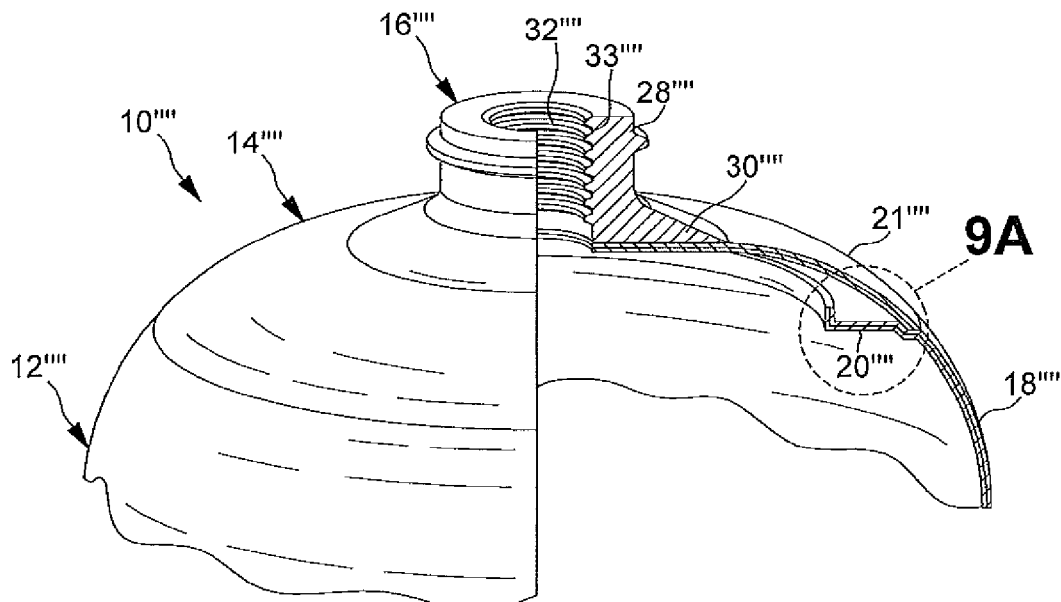
FIG. 9 is a fragmentary perspective view of a pressure vessel according to another embodiment of the present invention, a portion of the pressure vessel shown in section.
Figure 9A:
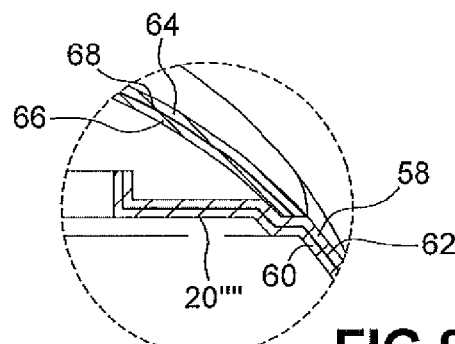
FIG. 9a is an enlarged fragmentary cross-sectional front elevational view of a portion of the pressure vessel illustrated in FIG. 9 and depicted by circle 9a therein.
Figure 10:
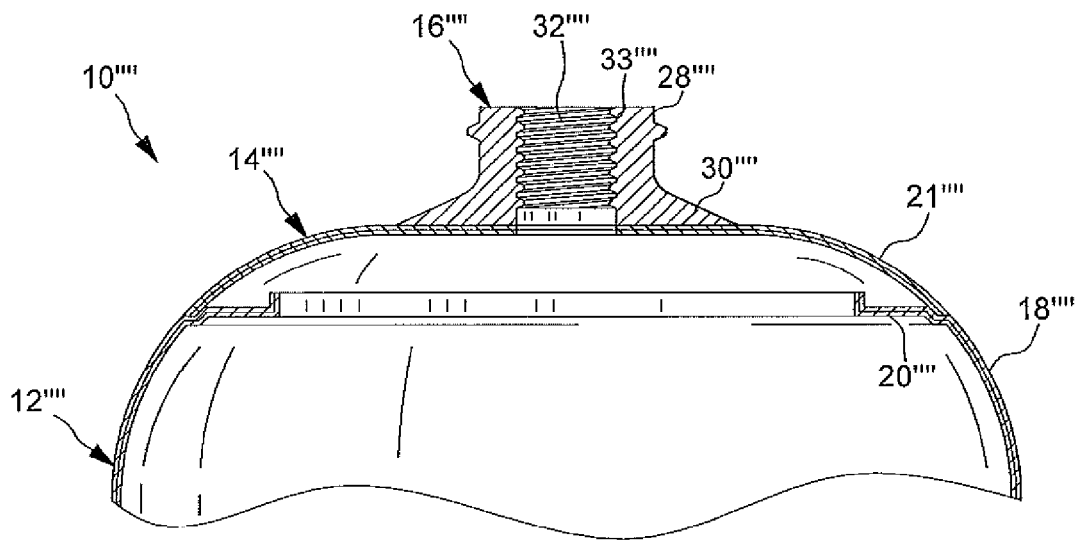
FIG. 10 is a fragmentary cross-sectional view of the pressure vessel of FIG. 9.

FIGS. 9, 9a, and 10 illustrate a pressure vessel 10"" according to another embodiment of the present invention similar to the pressure vessel 10 of FIGS. 1 and 2, except as described below. Structure repeated from the description of FIGS. 1 and 2 includes the same reference numeral. Variations of structure shown in FIGS. 1 and 2 include the same reference numeral and a quadruple-prime ("") symbol.

As shown in FIGS. 9, 9a, and 10 the vessel liner 12"" is a multi-layer liner including an outside layer 58 having a substantially smooth outer surface 18"", an inside layer 60, and a barrier layer 62 disposed between the outside layer 58 and the inside layer 60. However, any number of layers may be used. As a non-limiting example, the vessel liner 12"" may includes a tie layer (not shown) between at least one of the outside layer 58 and the barrier layer 62 and the inside layer 60 and the barrier layer 62. It is understood that the outside layer 58 and the inside layer 60 may be formed from the same or similar materials. It is further understood that the outside layer 58 and the inside layer 60 may be formed from different materials or similar materials having different physical properties. As a non-limiting example, the barrier layer 62 is formed from a copolymer such as EVOH.

The end cap 14"" is a multi-layer end cap including an outside layer 64, an inside layer 66, and a barrier layer 68 disposed between the outside layer 64 and the inside layer 66. However, any number of layers may be used. As a non-limiting example, the end cap 14"" may includes a tie layer (not shown) between at least one of the outside layer 64 and the barrier layer 68 and the inside layer 66 and the barrier layer 68. It is understood that the outside layer 64 and the inside layer 66 may be formed from the same or similar materials. It is further understood that the outside layer 64 and the inside layer 66 may be formed from different materials or similar materials having different physical properties. In certain embodiments, the inside layer 66 of the end cap 14"" is formed from the same material as the outside layer 58 of the vessel liner 12"". As a non-limiting example, the barrier layer 68 of the end cap 14"" is formed from a copolymer such as EVOH.

In use, at least one end cap 14"" is coupled to at least one end of the vessel liner 12"". As a non-limiting example, a shape of the vessel liner 12"" and the end cap 14"" is predetermined to maximize the coupling surface area therebetween and provide a durable coupling. It is understood that that the vessel liner 12"" may be coupled to the end cap 14"" using a welding procedure. As a non-limiting example, an adhesive may be used to couple the boss 16"" to the end cap 14"". However, other procedures may be used to facilitate the coupling as described in FIGS. 1 to 8. As such, the outer surface 18"" of the vessel liner 12"" is substantially "pinch line free", since only the flange portion 20"" has a pinch line from the forming process. It is understood that a longer "overlapping zone" between the end cap 14"" and the vessel liner 12"" minimizes gas permeation in comparison to conventional butt welding operations. Thereafter, the boss 16"" is coupled to the end cap 14"". As a non-limiting example, an adhesive may be used to couple the boss 16"" to the end cap 14"". However, other procedures may be used to facilitate the coupling.

Figure 11:
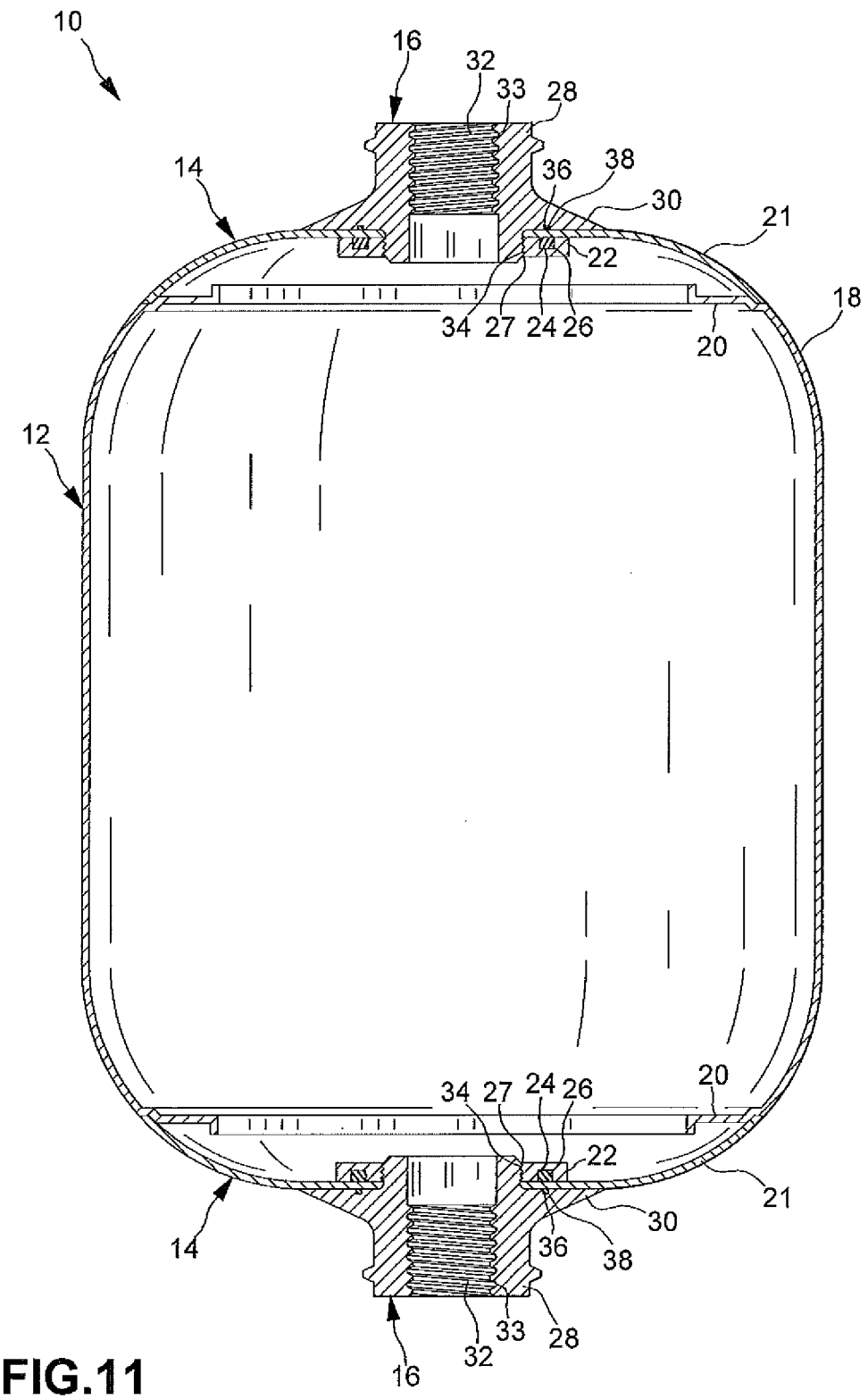
FIG. 11 is a cross-sectional side-elevational view of the pressure vessel liner according to the embodiment of FIG. 1.

FIG. 11 shows the formed liner 12 including a plurality of end caps 14 and bosses 16 secured to opposite ends thereof. In certain embodiments, the bosses 16 have similar inner diameters. However, it is understood that the bosses 16 may have any size and diameter such as a size and diameter suitable for coupling with a valve component or a thermal-pressure relief device (TPRD). It is understood that additional coatings and layers such as composites and fibers may be applied to the vessel liner 12 to form the final pressure vessel. As a non-limiting example, the addition layers formed around the vessel liner 12 may be formed by at least one of a winding process and a curing process known in the art. It is further understood that the vessel liner 12 and resultant pressure vessel may have any shape and size determined by the forming process.

Accordingly, the pressure vessel 10, 10', 10", 10"', 10"" provides the inner vessel liner 12, 12', 12", 12"" with the substantially smooth outer surface 18, 18"", without pinch lines, gaps, and grooves formed thereon, thereby providing a suitable surface to ensure proper filament winding. The vessel liner 12, 12', 12", 12"", may be formed using a multilayer or single layer material structure and may be formed using various molding and forming methods known in the art. The pressure vessel 10, 10', 10", 10"', 10"" also provides a secure liner-to-boss connection before welding and a quasi-static load of liner-boss sealing.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A pressure vessel for storing a fluid, the pressure vessel comprising:
   a vessel liner having a substantially smooth outer surface including a flange portion with an aperture formed therein;
   an end cap coupled to the vessel liner to substantially enclose the flange portion within the resultant pressure vessel, wherein the end cap includes an insert disposed around an aperture formed therein; and
   a boss coupled to the end cap, wherein a portion of the end cap is disposed between the insert and the boss.

2. The pressure vessel according to claim 1, wherein a first surface of the end cap forms a substantially continuous surface with the outer surface of the vessel liner.

3. The pressure vessel according to claim 1, wherein the end cap is coupled to the vessel liner using at least one of a welding process and an adhesive.

4. The pressure vessel according to claim 1, wherein the flange portion of the vessel liner includes a plurality of apertures and the end cap includes a plurality of retention clips formed along a sealing edge thereof, the apertures adapted to receive the retention clips to align and couple the end cap and the vessel liner.

5. The pressure vessel according to claim 1, wherein the end cap includes a plurality of engaging teeth formed along an inside surface thereof, the engaging teeth adapted to align and couple the end cap and the vessel liner.

6. The pressure vessel according to claim 1, wherein the insert includes at least one of a sealing element to form a fluid-tight seal with the end cap and a coupling device for receiving and securing the boss.

7. A pressure vessel for storing a fluid, the pressure vessel comprising:
   a vessel liner having a substantially smooth outer surface including a flange portion with an aperture formed therein;
   an end cap coupled to the vessel liner to substantially enclose the flange portion within the resultant pressure vessel, wherein the end cap includes an insert disposed around an aperture formed therein; and
   a boss coupled to the end cap, wherein the boss receives and secures a utility device to the end cap to direct and control fluid flow in and out of the pressure vessel, wherein a portion of the end cap is disposed between the insert and the boss and a first surface of the end cap forms a substantially continuous surface with the outer surface of the vessel liner.

8. The pressure vessel according to claim 7, wherein the end cap is coupled to the vessel liner using at least one of a welding process and an adhesive.

9. The pressure vessel according to claim 7, wherein the flange portion of the vessel liner includes a plurality of apertures and the end cap includes a plurality of retention clips formed along a sealing edge thereof, the apertures adapted to receive the retention clips to align and couple the end cap and the vessel liner.

10. The pressure vessel according to claim 7, wherein the end cap includes a plurality of engaging teeth formed along an inside surface thereof, the engaging teeth adapted to align and couple the end cap and the vessel liner.

11. The pressure vessel according to claim 7, wherein the insert includes at least one of a sealing element to form a fluid-tight seal with the end cap and a coupling device for receiving and securing the boss.

12. The pressure vessel according to claim 7, wherein the boss is integrally fixed within the end cap during a forming procedure of the end cap.

13. The pressure vessel according to claim 7, wherein the end cap includes a flange portion for securing the boss to the end cap.

14. The pressure vessel according to claim 7, wherein the boss includes a sealing element for forming a fluid-tight seal with at least one of the end cap and an insert coupled to the end cap.

15. The pressure vessel according to claim 1, wherein the end cap does not contact the flange.

* * * * *